United States Patent
Ulfelder, Jr. et al.

(10) Patent No.: US 10,915,586 B2
(45) Date of Patent: Feb. 9, 2021

(54) SEARCH ENGINE FOR IDENTIFYING ANALOGIES

(71) Applicant: Kensho Technologies, LLC, Cambridge, MA (US)

(72) Inventors: John Carleton Ulfelder, Jr., Montgomery, MD (US); Jason Craig Weinreb, Washington, DC (US); David William Bender, Washington, DC (US); Gabriel Altay, Alexandria, VA (US)

(73) Assignee: Kensho Technologies, LLC, Cambridge, MA (US)

( * ) Notice: Subject to any disclaimer, the term of this patent is extended or adjusted under 35 U.S.C. 154(b) by 275 days.

(21) Appl. No.: 15/935,863

(22) Filed: Mar. 26, 2018

(65) Prior Publication Data

US 2019/0205475 A1 Jul. 4, 2019

Related U.S. Application Data

(60) Provisional application No. 62/621,921, filed on Jan. 25, 2018, provisional application No. 62/612,302, filed on Dec. 29, 2017.

(51) Int. Cl.
  *G06F 16/00* (2019.01)
  *G06Q 10/00* (2012.01)
  (Continued)

(52) U.S. Cl.
  CPC ........ *G06F 16/9535* (2019.01); *G06F 3/0482* (2013.01); *G06F 16/248* (2019.01);
  (Continued)

(58) Field of Classification Search
  CPC ............... G06F 16/951; G06F 16/9558; G06F 16/2228; G06F 16/9535; G06F 16/24578;
  (Continued)

(56) References Cited

U.S. PATENT DOCUMENTS 6,691,120 B1 * 2/2004 Durrant ................ G06F 16/283
6,856,973 B1 * 2/2005 Bott ....................... G06Q 40/00
                                                              705/35
(Continued)

FOREIGN PATENT DOCUMENTS

WO    WO 03/069510 A1    8/2003

OTHER PUBLICATIONS

Joel Chan et al., "Scaling up Analogy with Crowdsourcing and Machine Learning", In Proceedings of the ICCBR 2016 Workshops. Atlanta, Georgiaa, USA, 2016, pp. 31-40.*

(Continued)

*Primary Examiner* — Srirama Channavajjala
(74) *Attorney, Agent, or Firm* — Fish & Richardson P.C.

(57) ABSTRACT

Methods, systems, and apparatus, including computer programs encoded on computer storage media, for a search engine for identifying analogies. One of the methods includes: receiving data that includes a set of user selected features and a user selected feature weight for at least one of the user selected features; generating a reference vector based on the received data; determining a level of similarity between the generated reference vector and each of a plurality of analogy vectors that each represent a potential analogy; providing, for output on a display of a user device, a set of one or more analogies based on the determined level of similarity; receiving a subsequent request to evaluate the set of one or more analogies based on a common attribute; determining, for each of the one or more analogies, a representation of the common attribute for each analogy over a time period; and providing, for display on the user device, a representation of the common attribute for each analogy over the time period.

13 Claims, 16 Drawing Sheets

(51) Int. Cl.

| | | |
|---|---|---|
| *G06F 16/9535* | (2019.01) | |
| *G06F 3/0482* | (2013.01) | |
| *G06F 16/248* | (2019.01) | |
| *G06Q 50/20* | (2012.01) | |
| *H04N 21/258* | (2011.01) | |
| *G06Q 30/02* | (2012.01) | |
| *G06Q 10/06* | (2012.01) | |
| *G06F 16/242* | (2019.01) | |
| *G06F 16/25* | (2019.01) | |
| *G06F 16/33* | (2019.01) | |

(52) U.S. Cl.
CPC ........ *G06F 16/2425* (2019.01); *G06F 16/252* (2019.01); *G06F 16/3334* (2019.01); *G06Q 10/067* (2013.01); *G06Q 10/0639* (2013.01); *G06Q 30/0205* (2013.01); *G06Q 50/20* (2013.01); *H04N 21/25883* (2013.01)

(58) Field of Classification Search
CPC .. G06F 16/243; G06F 16/3347; G06F 3/0482; G06F 3/04842; G06F 16/2425; G06F 16/252; G06F 16/24; G06F 16/3334; G06Q 30/0205; G06Q 40/00; G06Q 10/0639; G06Q 10/067; H04N 21/25883
See application file for complete search history.

(56) References Cited

U.S. PATENT DOCUMENTS

| | | | | |
|---|---|---|---|---|
| 7,406,436 | B1* | 7/2008 | Reisman | G06Q 30/02 705/7.32 |
| 8,005,740 | B2* | 8/2011 | Arnott | G06Q 30/02 705/36 R |
| 8,306,892 | B1* | 11/2012 | Gross | G06Q 40/06 705/36 R |
| 8,738,487 | B1* | 5/2014 | Schmidt | G06Q 40/04 705/35 |
| 2006/0238409 | A1* | 10/2006 | Yoshioka | G01C 21/3623 342/126 |
| 2008/0091727 | A1* | 4/2008 | Wynett | G06N 5/04 |
| 2009/0198692 | A1* | 8/2009 | Aparicio, IV | G06N 5/022 |
| 2009/0204517 | A1* | 8/2009 | Edens | G06Q 40/12 705/30 |
| 2010/0332583 | A1* | 12/2010 | Szabo | G06F 16/248 709/202 |
| 2011/0010352 | A1* | 1/2011 | Jockisch | G06F 16/951 707/706 |
| 2011/0109435 | A1 | 5/2011 | Bickel et al. | |
| 2011/0161243 | A1* | 6/2011 | Brunswig | G06Q 10/06 705/348 |
| 2012/0254310 | A1* | 10/2012 | Kamimaeda | G06F 16/437 709/204 |
| 2013/0060603 | A1* | 3/2013 | Wagner | G06Q 30/0202 705/7.29 |
| 2013/0132139 | A1* | 5/2013 | Yeung | G06F 16/285 705/7.11 |
| 2013/0269035 | A1* | 10/2013 | Bajaj | G06Q 10/00 726/26 |
| 2014/0304174 | A1* | 10/2014 | Scott | G06Q 10/103 705/301 |
| 2014/0344186 | A1* | 11/2014 | Nadler | G06Q 10/067 705/36 R |
| 2015/0242538 | A1* | 8/2015 | Bendiabdallah | G06F 8/20 707/738 |
| 2015/0363865 | A1 | 12/2015 | Ramanuja et al. | |
| 2016/0092557 | A1 | 3/2016 | Stojanovic et al. | |
| 2016/0260033 | A1* | 9/2016 | Keyngnaert | G06Q 10/063 |
| 2017/0161652 | A1* | 6/2017 | Porth | G06F 3/0481 |

OTHER PUBLICATIONS

Tom Hope et al., "Accelerating Innovation Through Analogy Mining", KDD '17, Aug. 13-17, 2017, Halifax, NS, Canada, pp. 1-9.*
International Searching Authority, International Search Report and Written Opinion, PCT/US2018/064048, dated Mar. 25, 2019, 10 pages.
PCT International Preliminary Report on Patentability in International Appln. No. PCT/US2018/064048, dated Jun. 30, 2020, 7 pages.

* cited by examiner

SEARCH ENGINE FOR IDENTIFYING ANALOGIES

CROSS-REFERENCE TO RELATED APPLICATIONS

This application claims the benefit under 35 U.S.C. § 119(e) of the filing date of U.S. Patent Application No. 62/612,302, for "Search Engine for Identifying Historical Analogies", which was filed on Dec. 29, 2017 and which is incorporated here by reference. This application also claims the benefit under 35 U.S.C. § 119(e) of the filing date of U.S. Patent Application No. 62/621,921, for "Search Engine for Identifying Analogies" which was filed on Jan. 25, 2018 and which is incorporated here by reference.

BACKGROUND

Technical Field

This specification relates to systems and methods for identifying and exploring cases that are analogous to a reference case so as to aid an user's understanding of the reference case.

Background

Analysts will often seek to understand what will happen in a particular country of interest by looking at how analogous countries fared in the past. There is a need for a consistent, objective, efficient and fast way for an analyst to discover analogous cases to a reference case to aid an analyst's understanding of the reference case.

SUMMARY

This specification describes technologies to help analysts understand and anticipate developments in situations of interest, e.g., geopolitical situations, by objectively and efficiently identifying analogous cases, e.g., from recent history.

In general, one innovative aspect of the subject matter described in this specification can be embodied in systems that include: an aggregator operable to ingest, normalize and aggregate third party data sets; a user interface operable to receive data that includes a set of user selected features and a feature weight for at least one of the user selected features; a master data repository operable to store normalized and aggregated data received from the aggregator; and a processing engine. The processing engine is operable to: receive normalized and aggregated data from the master data repository; receive a set of user selected features and a feature weight for at least one of the user selected features from the user interface; generate a reference vector based on the received data; determine a level of similarity between the generated reference vector and each of a plurality of analogy vectors that each represent a potential analogy; provide, for output on a display of a user device, a set of one or more analogies based on the determined level of similarity; receive a subsequent request to evaluate the set of one or more analogies based on a common attribute; determine, for each of the one or more analogies, a representation of the common attribute for each analogy over a time period; and provide, for display on the user device, a representation of the common attribute for each analogy over the time period. Embodiments of the system can allow a user to select more than one common attribute for display.

In certain embodiments, the user is not required to select a feature weight. The feature weights can be set as equal by default. The aggregator and the master data repository can be housed in a single server or in separate servers. The selected features can include one or more economic features, one or more political features, one or more demographic features, and one or more security features.

Embodiments of a method described in this specification include: receiving data that includes a set of user selected features and a set of feature weights for the user selected features; generating a reference vector based on the received data; determining a level of similarity between the generated reference vector and each of a plurality of analogy vectors that each represent a potential analogy; providing, for output on a display of a user device, a set of one or more analogies based on the determined level of similarity; receiving a subsequent request to evaluate the set of one or more analogies based on a common attribute; determining, for each of the one or more analogies, a representation of the common attribute for each analogy over a time period; and providing, for display on the user device, a representation of the common attribute for each analogy over the time period.

Yet another innovative aspect of the subject matter described in this specification can be embodied in methods that include the actions of: receiving data that specifies a place, a time for an event, a category for the event, a set of user selected features and a feature weight for at least one of the user-selected features, and a time period for potential analogies; generating a reference metric based on at least part of the received data; determining a level of similarity based at least in part on the generated reference metric and each of a plurality of analogy metrics that each represent a potential analogy; providing, for output on a display of a user device, a set of one or more analogies based on the determined level of similarity; receiving a subsequent request to evaluate the set of one or more analogies based on a common attribute; determining, for each of the one or more analogies, a representation of the common attribute for each analogy over the time period; and providing, for display on the user device, a graphical representation of the common attribute for each analogy over the time period.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. The foregoing and other embodiments can each optionally include one or more of the following features, alone or in combination. In particular, one embodiment includes all the following features in combination.

The selected features can include one or more economic features, one or more political features, one or more demographic features, and one or more security features.

Generating a reference vector based on the received data can include generating a feature vector that is encoded to include one or more economic features, one or more political features, one or more demographic features, and one or more security features.

Each analogous entity vector of the plurality of analogous entity vectors can include a feature vector that is encoded to include one or more economic features, one or more political features, one or more demographic features, and one or more security features.

Determining a level of similarity between the generated reference vector and each of a plurality of analogous entity vectors that each represent a potential analogous entity can include: determining a distance between the generated reference vector and each of the plurality of vectors representing a potential analogous entity.

Determining a distance between the generated reference vector and each of the plurality of vectors representing a potential analogous entity can include: determining a Euclidean distance between the generated reference vector and each of the plurality of vectors representing the potential analogous entity.

The common attribute can be one of a democracy index, GDP, similarity and government type. The method can further include transforming selected features of a set of potential analogies to produce the plurality of analogy vectors. Receiving data can further include receiving data that includes a user-selected entity. In one embodiment, the user-selected entity can be a country and a month.

The subject matter described in this specification can be implemented in particular embodiments so as to realize one or more of the following advantages. Embodiments described in this specification improve on the traditional ad hoc approach to finding analogous cases in several ways. The first is the rigor of the analogizing process described in this specification. Embodiments described herein assess the similarity between the case for which analogies are being sought (a.k.a. the reference case) and all other possible cases in the dataset using an algorithm that computes the distance between cases in the multidimensional vector space implied by the features on which an analyst chooses to base the potential analogies. The resulting similarity scores provide a much more reliable and objective basis for analogizing than the traditional approaches.

Moreover, embodiments described herein provide interactivity and efficiency. Embodiments described herein give analysts a simple user interface that allows them to select a reference case and specify relevant features and then return analogies from a massive set of potential matches in a matter of seconds. Traditionally, analysts would have needed to assemble and merge relevant data sets themselves, devise rules for assessing similarity, and then implement those rules for their specific use case. With embodiments described herein, a process that would have taken days or fallen outside an analyst's skill sets can be completed quickly and then easily iterated upon if desired. Embodiments described herein save analysts a great deal of time, give them reliable, objective results, and make the analogizing process available to analysts who would have been unable to approximate it on their own.

Embodiments described in this specification provide the opportunity for an analyst to expand her search beyond the case or set of cases (e.g., geographic region) she knows well. Without a tool like this one, an analyst has to limit her search for analogies to cases she already knows or for which she can easily find data. Those constraints sharply narrow the scope of her search and are more likely to lead to biased results.

Yet another advantage of embodiments described in this specification is that they allow an analyst to use hypothetical country statistics to discover analogies as well. For example, an analyst can explore what country-month analogies for the US in 1960 would be if the U.S. was as oil rich as Saudi Arabia. In other words, embodiments described in this specification allow a user to hypothesize scenarios as if a certain event occurred or if data features changed and then ask what to which country-time pair would the target country or event analogize.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
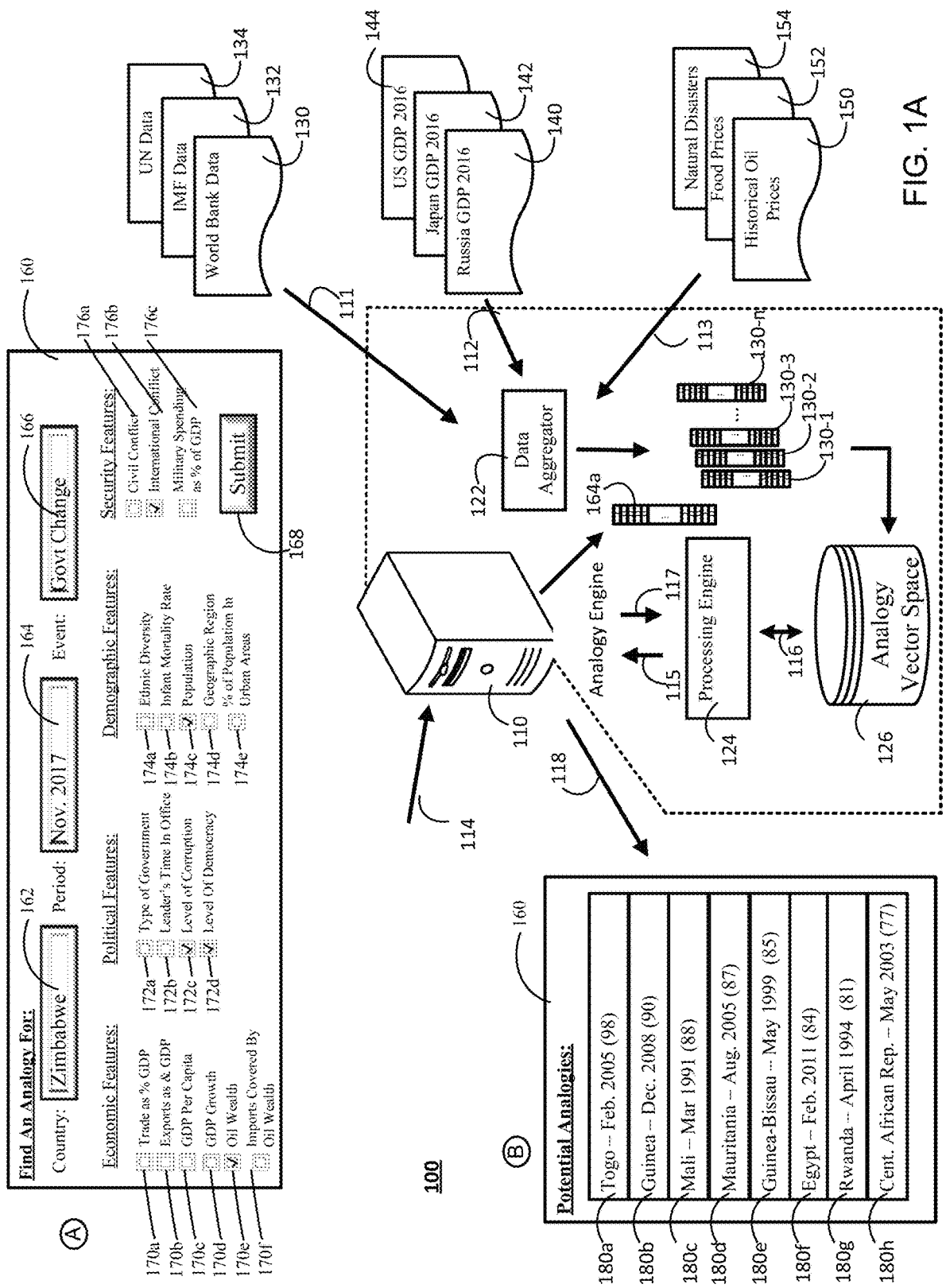
FIG. 1A is a diagram of an example of an analogy engine system for generating a set of analogous entities.

FIG. 1A is a diagram of an example of an analogy engine system 100 for generating a set of analogous entities 180*a*-

180*h*. The analogy engine system 100 includes an analogy engine 110 and a user device that includes a display 160. The user device having a display 160 may include, for example, a smartphone, a tablet, a laptop computer, a desktop computer, or the like.

The analogy engine 110 is a set of one or more software components that are stored, and executed by, one or more server computers. The software components stored, and executed by, the one or more server computers may include a data aggregator 122, a processing engine 124, and an analogy vector space 126.

Prior to receiving a selection of one or more features from a user device having a display 160 at time t, the analogy engine 110 is configured to generate the analogy vector space 126. For example, the analogy engine 110 uses a data aggregator 122 to obtain 111, 112, 113 data from multiple disparate data sources that respectively store heterogenous data records (e.g., world bank data 130, IMF data 132, UN data 134, Russia GDP data 140, Japan GDP data 142, US GDP data 144, historical oil price data 150, food price data 152, and natural disaster data 154).

The data aggregator 122 can normalize the obtained heterogeneous data and identify particular geopolitical features associated with the normalized data. Normalizing the heterogeneous data records may include analyzing the obtained heterogeneous data records to determine the source of each data record. Once the source of the data record is determined, the system can determine a class that is associated with the source. The class may include one or more processes that can be used to transform the record into a normalized format such as entity-year, entity-month, or the like. In some implementations, the entity may include a country, a corporation, a person, or the like. The processes performed by each class may be source-specific. These processes may include dividing source features by their annual global medians; clipping or truncating features to remove outliers; applying monotonic transformations to features (such as square root and natural logarithm); computing the percent change in features over any length of time; and resealing features between 0 and 1 using any number of functions.

The data aggregator 122 can extract the identified geopolitical features, weight the extracted geopolitical features, or both, and generate one or more potential analogy vectors 130-1, to 130-*n*, where n is any positive integer greater than zero. The identified and extracted geopolitical features that are used to generate the potential analogy vectors may include one or more of an entity name (e.g., a country name, a company name, a person name, or the like), a time period, an event, economic features, political features, demographic features, security features, or the like.

The economic features may include trade as a percentage of gross domestic product (GDP), exports as a percentage of GDP, GDP per capita, GDP growth, oil wealth as a percentage of GDP, imports covered by reserves, or the like. The political features may include type of government associated with the entity, the time the leader of the entity has been in office, the level of corruption associated with the entity the level of democracy associated with the entity, or the like. The demographic features may include ethnic diversity associated with the entity, infant mortality rate associated with the entity, population associated with the entity, geographic region associated with the entity, percentage population in urban areas, or the like. The security features associated with the entity may include civil challenge or conflict associated with the entity, international challenge or conflict associated with the entity, military spending as a percentage of GDP, or the like. The entity can include a country, a territory, an organization such as a corporation or an intergovernmental organization (e.g., NATO), an individual such as a political leader, or a sub-national entity.

The generated potential analogy vectors 130-1 to 130-*n* may be stored in an analogy vector space 126. The analogy vector storage space 126 is a storage unit that stores a plurality of potential analogy vectors 130-1 to 130-*n*. The analogy vector space 126 can be searched using a processing engine 124 based on a received reference vector 164*a*. The potential analogy vectors 130-1 to 130-*n* output by the data aggregator may each represent a potential analogy to a reference vector 164*a* that is generated based on user input. In some implementations, the data structure such as a database table that is used to store the potential analogy vectors may be configured to store a flexible number of features for each potential analogy vector.

After generating the analogy vector space 126, a user may submit a request for the analogy engine 110 to find one or more entities that are potentially analogous to a set of features input by a user of a user device having a display 160. For example, with reference to the display 160 of the user device at stage A, a user may select (or otherwise input) a plurality of features, features weights, or both. The features may include one or more geopolitical features. In the example of FIG. 1A, a user has selected features that include the country 162 "Zimbabwe," a time period 164 "November 2017," an event 166 "successful coup," economic feature "oil wealth" 170*e*, political features that include level of corruption 172*c* and level of democracy 172, demographic feature of population 174*c*, and a security feature such as international challenge or conflict 176B.

In some implementations, the user of the user device having display 160 may also select (or otherwise input) one or more weights for one or more of the selected features. This enables the user of the user device having the display 160 to stress the importance of one or more particular features of the selected features to the analogy engine 110. In some implementations, the user may input a numerical value between 0 and 1 for one or more features to weight features. Alternatively, in some implementations, the user may select predefined weight categories such as high, medium, and low. The analogy engine 110 can then map the selected category to a numerical value between 0 and 1.

The analogy engine 110 can receive 114 the features selected by the user, the feature weights selected by the user, or both. The analogy engine 110 can generate a reference vector 164*a* based on the selected features. The reference vector 164*a* may represent an entity in a multidimensional feature space using a set of geopolitical features identified in display 160 that include one or more of an entity name (e.g., a country name, a company name, a person name, or the like), a time period, an event, economic features, political features, demographic features, security features, or the like. The economic features may include trade as a percentage of gross domestic product (GDP), exports as a percentage of GDP, GDP per capita, GDP growth, oil wealth, imports covered by oil wealth, or the like. The political features may include the type of government associated with the entity, the time the leader of the entity has been in office, the level of corruption associated with the entity the level of democracy associated with the entity, or the like. The demographic features may include ethnic diversity associated with the entity, infant mortality rate associated with the entity, population associated with the entity, geographic region associated with the entity, percentage population in urban areas, or the like. The security features associated with the entity may include civil challenge or conflict associated with the entity, international conflict or challenge associated with the entity, military spending as a percentage of GDP, or the like. As noted above, an entity can may include a country, a territory, or an organization such as a corporation or an intergovernmental organization (e.g., NATO), an individual such as a political leader, or a sub-national entity.

The analogy engine 110 can scale the selected features based on one or more feature weights. In some implementations, the features of the reference vector 164*a* may be scaled according to a set of one or more default weights. For example, if the user of the user device having a display 160 does not select any feature weights, then the analogy engine 110 may scale each feature of generated reference vector 164*a* using a set of default weights that assigns the same value weigh (e.g., 1) to each feature of the reference vector 164*a*. In other words, the generated reference vector is a vector of values associated with the user-selected reference entity, e.g., a particular country-month, like "Russia January 2018". In one embodiment, this generated reference vector is compared to other entities in the dataset to generate a set of distances that can be ordered to determine potential analogies. Alternatively, the analogy engine 110 may scale the features of reference vector 164*a* using a combination of user selected feature weights and default features. For example, for those features where the user selected a feature weight, the analogy engine may adjust the default weight for that feature based on the selected feature weight. If no weight was selected for a feature, then the analogy engine 110 may assign a default feature weight to the feature. Though the examples above indicate that the default feature weights may each be equal, the present disclosure need not be so limited. Instead, for example, a set of default weights may be configured that have different default weights for different features of the reference vector 164*a*.

The analogy engine 110 may use the processing engine 124 to obtain a set of potential analogy vectors that the processing engine 124 determines are sufficiently analogous to the reference vector 164*a*. The analogy engine 110 may provide 117 the reference vector 164*a* to the processing engine 124. The processing engine 124 may access 116 the analogy vector space 126 and identify one or more potential analogy vectors 130-1 to 130-*n* that are determined to be sufficiently similar to the reference vector 164*a*. In some implementations, the processing engine 124 may determine similarity between a reference vector 164*a* and one or more potential analogy vectors by performing a distance calculation between the reference vector 164*a* and each of the plurality of potential analogy vectors 130-1 to 130-*n* that are stored in the analogy vector space 126. In such implementations, a potential analogy vector 130-1 may be determined to be sufficiently similar to the reference vector 164*a* if the potential analogy vector is determined to be within a predetermined distance of the reference vector 164*a* in the vector space 126. The distance calculation may be performed using a euclidean distance calculation. Alternatively, in other implementations, the distance calculation may be performed using a cosine distance function. Yet other types of similarity measures may also be employed. For example, the potential analogy vectors can be identified in some implementations based on the use of one or more machine learning models, one or more clustering algorithms, or a combination thereof. One could employ 1) a measure of distance below a certain threshold as an indication of similarity; 2) membership in an identical cluster (determined by some distance metric) as constituting similarity; 3) some (potentially weighted) ensemble of these two approaches as indicating similarity.

The processing engine 124 can select a subset of potential analogy vectors 130-1 to 130*n* that are determined to be sufficiently similar to the received referenced vector 164*a*. The selected subset of potential analogy vectors 130-1 to 130-*n* that are determined to be sufficiently similar to the reference vector 164*a* may be selected based on a calculated distance between the reference vector 164*a* and the potential analogy vectors in the vector space 126. Although the analogy vectors 130-1 to 130-*n* are shown in FIG. 1A as being generated by the data aggregator 122 and as being provided to the analogy vector space (AVS) 126, in certain embodiments the analogy vectors 130-1 to 130-*n* or a subset of those vectors can be passed from the AVS 126 to the processing engine. The processing engine 124 may provide the selected subset of potential analogy vectors 130-1 to 130-*n* to the analogy engine 110. The analogy engine 110 can determine, based on the selected subset of potential analogy vectors 130-1 to 130-*n*, a set of potentially analogous entities. For example, the analogy engine 110 can identify a particular entity (as described above) that corresponds to each respective potential analogy vector in the selected subset of potential analogy vectors. The analogy engine 110 may determine a score for each identified entity that is indicative of the entities' level of similarity to the reference vectors 164*a*. In some implementations, the score may be the determined distance between the reference vector 164*a* and the potential analogy vector that is associated with each respective entity.

Alternatively, in some implementations, the score provided by the analogy engine 110 for each analogous entity may be a different value such as a scaled similarity value (e.g., result of a distance calculation) indicative of a similarity between the reference vector 164*a* and one or more potential analogy vectors 130-1 to 130-*n*. In some implementations, for example, scaling the similarity value may include transforming the result of a distance calculation, or other similarity value, into a value between 0 and 100. Such a transformed value may be easier for a user to understand than the result of the distance calculation or some other similarity value (e.g., output of a machine learning model, results of a clustering algorithm, or the like).

In some implementations, the analogy engine 110 may perform additional post processing operations in an effort to reduce the number of potentially analogous entities that are returned in response to receipt of a reference vector 164*a*. For example, for the instances where a user selected a feature that corresponds to the occurrence of a particular event, the analogy engine 110 may eliminate any potentially analogous entity that is not associated with the occurrence of that particular type of event (e.g., a presidential election, or a legislative election).

Alternatively, or in addition, the analogy engine 110 may apply one or more predetermined filtering rules in an effort to reduce the number of potentially analogous entities that are returned to the user. For example, the analogy engine 110 can apply one or more filtering rules to ensure that any particular entity is only returned as a potentially analogous entity one time. For example, though USSR of 1979, USSR of 1983, and USSR of 1985 may be determined to be potentially analogous entities to Cuba of 1992, the analogy engine may only select one potentially analogous Soviet Russia from a particular time period. The selection of the particular entity may be done based on a temporal similarity (e.g., the entity that is closest in time to the reference vector).

Alternatively, the selection of the particular entity may be done based on a determination of the entity having the highest similarity value (e.g., lowest distance between the reference vector and the potential analogy vector associated with the entity).

These post-processing techniques can improve the performance of the analogy engine and user device. For example, the reduction in the number of search results provided to the user device can conserve bandwidth used by the networks connecting the analogy engine 110 and the user device. In addition, a lesser number of search results results in less data that needs to be processed for transmission by the analogy engine 110 and less data that needs to be processed and rendered by the user device. Such advantages conserve processing power of both the analogy engine 110 and user device. In addition, these advantages lead to the reduction in power usage by the user device and analogy engine because of the reduction in processing power. Battery life of the user device is also enhanced by reducing the processing required by the user device. Furthermore, the user receives immediate access to a concise list of the most relevant analogies.

The analogy engine 110 may provide the set of entities that is identified based on the selected subset of potential analogy vectors a score (e.g., actual result of a similarity calculation such as a distance, a scaled similarity calculation, or both) for each entity of the set of entities to the user device for output on the display 160 at stage B. In some implementations, the output of the set of entities may include a bar chart that visually serves to compare and contrast similarity scores between potentially analogous entities, or a heat map that visually serves to compare and contrast the similarity of potentially analogous entities on each user-selected feature.

At stage B, at least a portion of the display is configured to output the subset of entities 180a to 180h that are potentially analogous to the reference vector 164a. In some implementations, the display 160 at staged B may provide an interactive user interface that allows a user to select a common attribute that is shared amongst the analogous entities 180a to 180h and view visualizations that are dynamically rendered on the display 160 to represent the level of that common attribute for each analogous entity. Examples of the interactive nature of such an interactive user interface are provided with reference to FIGS. 7 to 12.

Figure 1B:
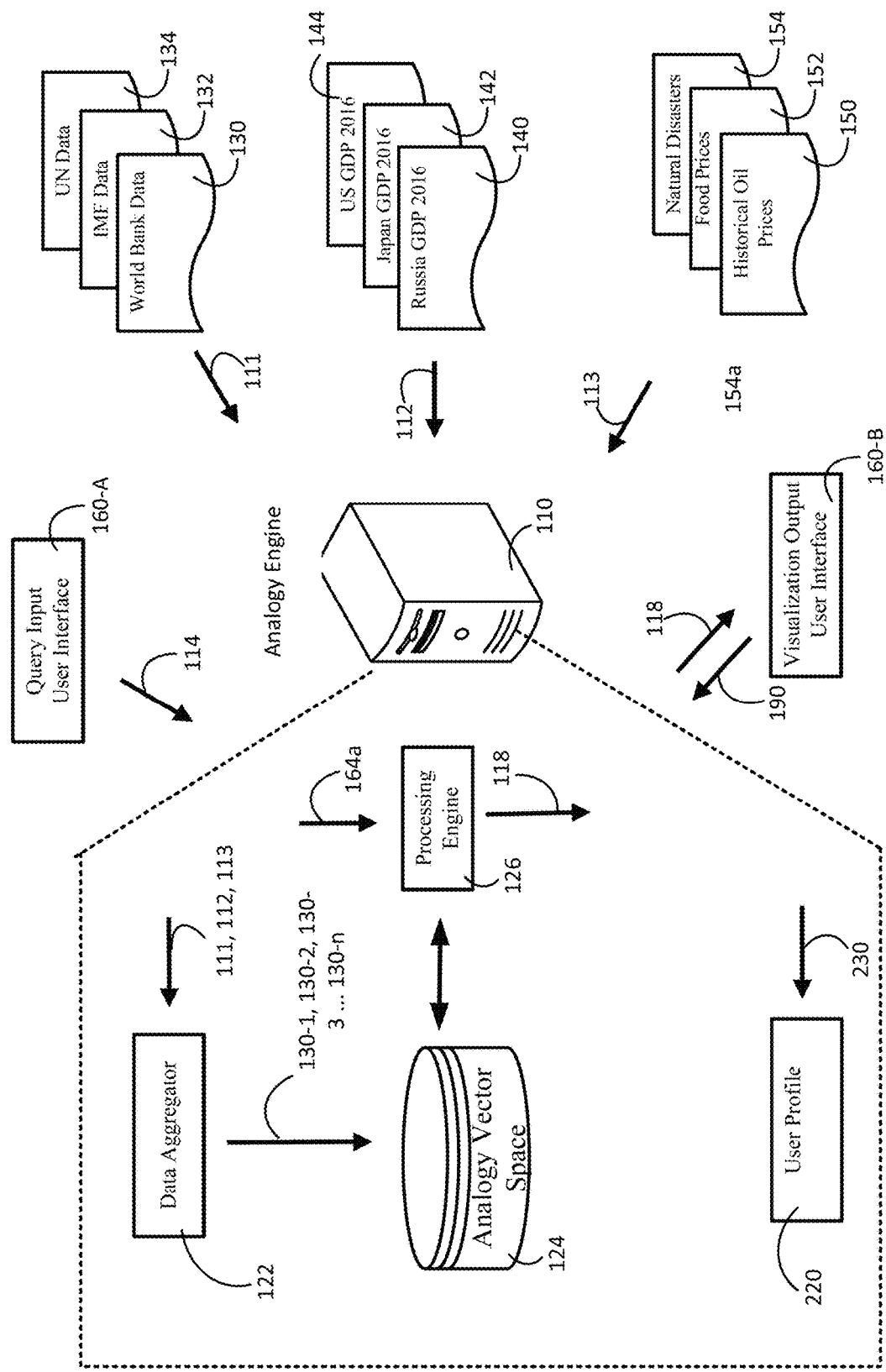
FIG. 1B is a contextual diagram of one example of an analogy engine of FIG. 1A.

FIG. 1B is a contextual diagram of one example of an analogy engine of FIG. 1A. FIG. 1B provides an example of the same analogy engine 110 of FIG. 1A. For example, the analogy engine 110 is configured to obtain 111, 112, 113 heterogeneous data 130, 134, 134, 140, 142, 144, 150, 152, 154 from multiple disparate data sources and provide the obtained 111, 112, 113 heterogenous data to the data aggregator. The data aggregator can normalize the obtained 111, 112, 113 heterogenous data and generate potential analogy vectors for storage in the analogy vector space 124. The potential analogy vectors may be generated by extracting a particular set of one or more geopolitical features from the normalized data. The analogy engine 110 can then receive 114 search queries from the user interface 160-A that includes a plurality of geopolitical feature vectors, feature weights, or both, and generate a reference vector 164a for input into the processing engine 126. The processing engine 126 may then identify potential analogy vectors stored in the analogy vector space 124 that are sufficiently similar to the received reference vector. The processing engine 118, the analogy engine 110, or both may identify a set of analogous entities based on the identified potential analogy vectors.

The identified set of analogies may then be provided 118 for output on a display 160-B of the user device. The analogy engine 110 of FIG. 1B differs from the analogy engine of FIG. 1A because of the user of the user profile 220.

The user profile 220 can be used to improve the identification of potentially analogous entities. For example, the analogy engine 110 can be configured to detect, obtain 190 and store 230 user queries (e.g., selection of one or more geopolitical features, one or more feature weights, or a combination thereof) and potentially analogous entity selections. Data representing such user interaction may be stored 230 in a user profile. This user profile data may be used to dynamically adjust feature weights, dynamically filter future search results, or a combination thereof.

Figure 1C:
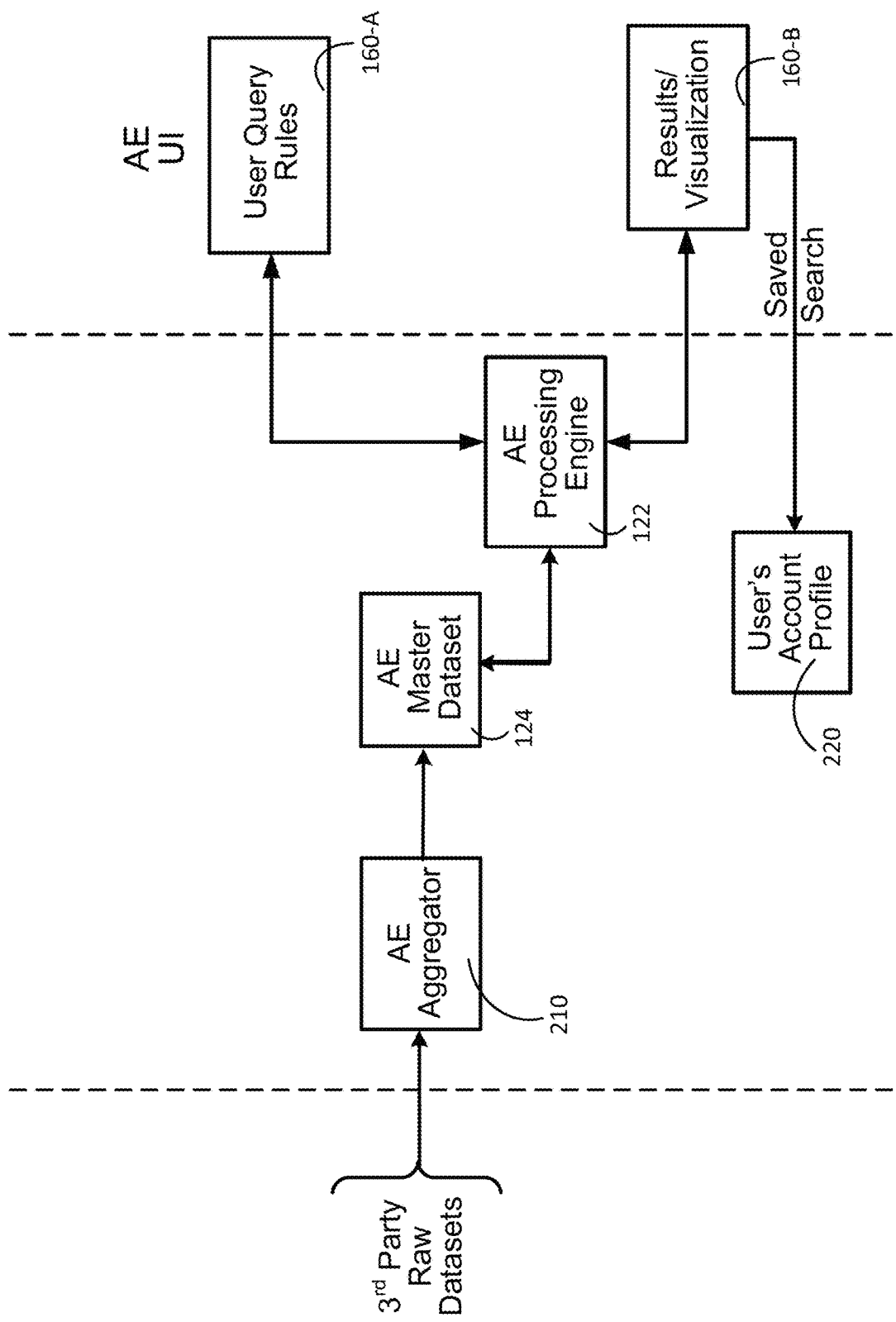
FIG. 1C is a block diagram of an example of an analogy engine of FIG. 1A and FIG. 1B.

FIG. 1C is a block diagram of an example of the analogy engine of FIG. 1A and FIG. 1B. The data aggregator 122, the processing engine 124, the analogy vector space 126, the user interface 160-A, and user interface 160-B of FIG. 1C are the same as the data aggregator 122, processing engine 124, analogy vector space 126, user profile 220, user interface 160-A (or 160 state A), and user interface 160-B (or 160 state B) of FIG. 1A and FIG. 1B, respectively, with like numerals identifying like components. FIG. 1C merely provides a block-diagram of a schematic of the systems depicted in the contextual diagrams of FIG. 1A and FIG. 1B.

Figure 2A:
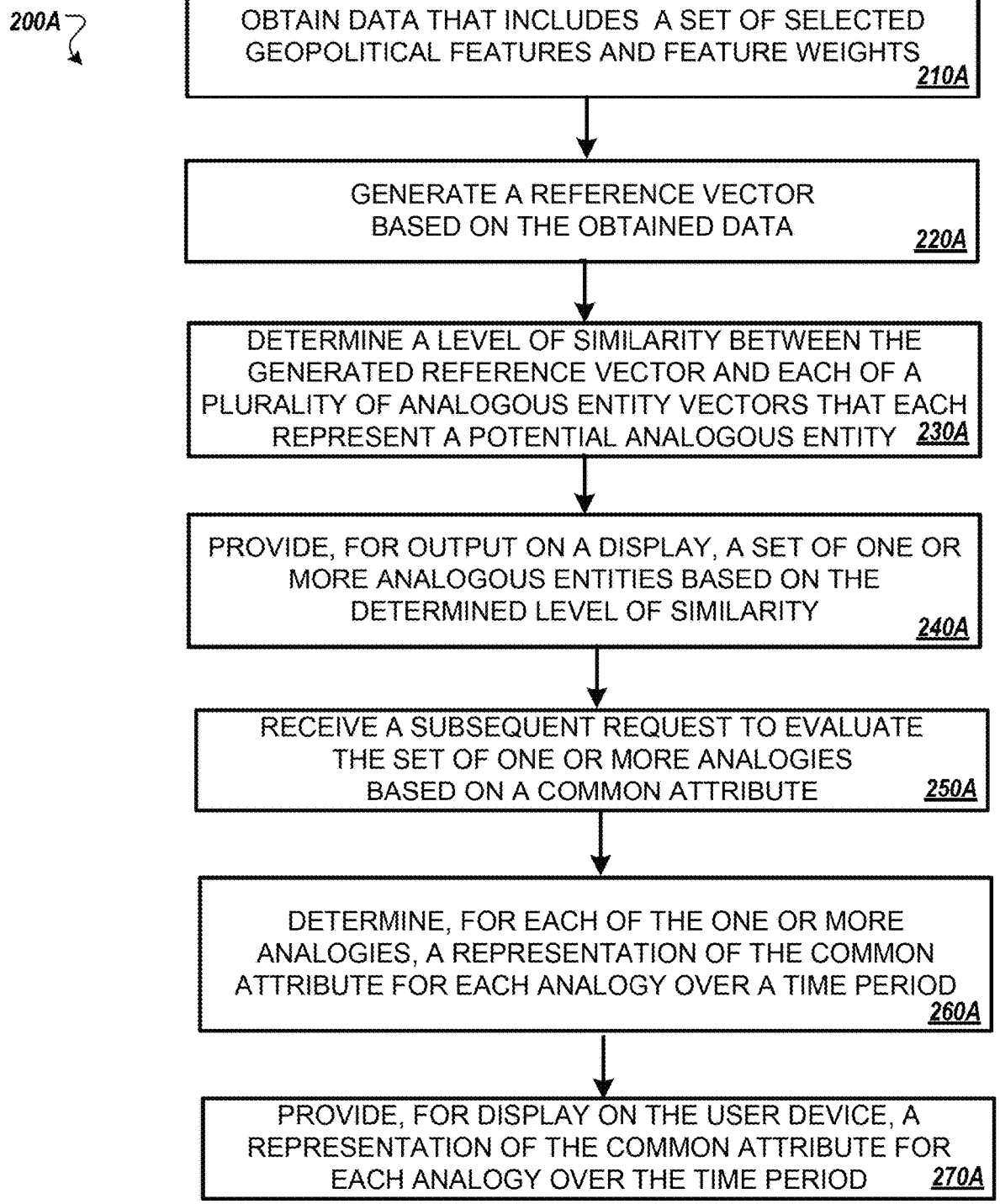
FIG. 2A is a flowchart of an example process for generating a set of analogous entities.

FIG. 2A is a flowchart of an example process 200A for generating a set of analogous entities. Generally, the process 200A includes obtaining data that includes a set of selected geopolitical features and feature weights (210A), generating a reference vector based on the obtained data (220A), determining a level of similarity between the generated reference vector and each of a plurality of analogous entity vectors that each represent a potential analogous entity (230A), determining a level of similarity between the generated reference vector and each of a plurality of analogous entity vectors that each represent a potential analogous entity (240A), receiving a subsequent request to evaluate the set of one or more analogies based on a common attribute (250A), determining, for each of the one or more analogies, a representation of the common attribute for each analogy over a time period (270A). For convenience, the process 200A will be further described below as being performed by a system such as the system 100 described with reference to FIG. 1A.

In more detail, a system can begin execution of the process 200 by obtaining 210A data that includes a set of selected geopolitical features and feature weights. Obtaining the data may include, for example, receiving data that is indicative of one or more selections of one or more geopolitical features and one or more feature weights input by a user via a user interface of a user device. The user device may include, for example, a smartphone, a table computer, a laptop computer, a desktop computer, or the like.

The system can generate 220A a reference vector based on the data obtained at stage 210A. The reference vector may include a multidimensional feature vector that is based on the geopolitical features and feature weights selected by the user. The reference vector may represent a particular entity for which the user is seeking analogous entities using the selected geopolitical features and feature weights.

The system can determine 230A a level of similarity between the generated reference vector and each of a plurality of analogous entity vectors that each represent a potential analogous entity. In some implementations, the determined level of similarity may include a distance that is calculated between the generated reference vector and each of the plurality of analogous entity vectors. The distance may be calculated using Euclidean distance, a cosine distance, or the like.

The system may provide 240A, for output on a display, a set of one or more analogous entities based on the determined level of similarity. For example, the set of one or more analogous entities may include one or more entities that were determined to be represented in a vectors space by an analogy vector that is within a predetermined threshold distance of the reference vector.

The system may receive 250A a subsequent request to evaluate the set of one or more analogies based on a common attribute. For example, a user may submit a request to evaluate the set of one or more analogies based on a geopolitica attribute such as GDP, a democracy index, a government type, similarity, or the like.

The system may determine 260A, for each of the one or more analogies, a representation of the common attribute for each analogy over a time period. For example, the system may determine a numerical representation of a geopolitical attribute such as GDP, a democracy index, a government type, or the like and plot the numerical representations of the geopolitical attribute on an X-Y axis. However, types of representations of the common attribute may be used.

The system may provide 270A, for display on the user device, a representation of the common attribute for each analogy over the time period. For example, the user device may receive rendering data from the analogy engine, or other server, that when processed, results in the user device rendering a plurality line graphs showing the change in the common attribute for each respective analogy.

Figure 2B:
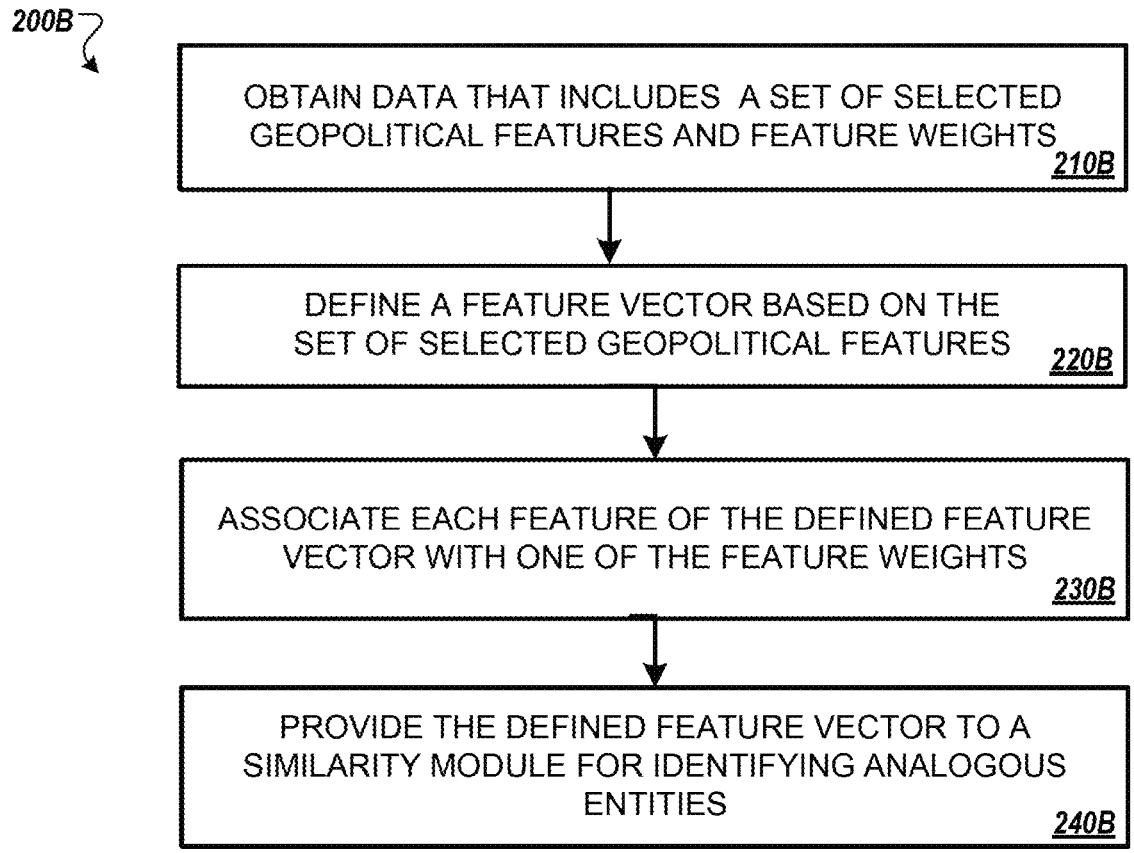
FIG. 2B is a flowchart of an example of a process for generating a reference vector.

FIG. 2B is a flowchart of an example of a process 200B for generating a reference vector. Generally, the process 200B includes obtaining data that includes a set of selected geopolitical features and feature weights (210B), defining a feature vector based on the set of selected geopolitical features (220B), associating each feature of the defined feature vector with one or more of the feature weights (230B), and providing the defined feature vector to a similarity module for identifying analogous entities (240B). For convenience, the process 200B will be further described below as being performed by a system such as system system 100, the system 200, or the system 300 described with reference to FIG. 1, 2, or 3 respectively.

In more detail, a system may begin performance of the process 200B by obtaining 210B data that includes a set of selected geopolitical features and feature weights. Obtaining the data may include, for example, receiving data that is indicative of one or more selections of one or more geopolitical features and one or more feature weights input by a user via a user interface of a user device. The user device may include, for example, a smartphone, a table computer, a laptop computer, a desktop computer, or the like.

The system may define 200B a feature vector based on the set of selected geopolitical features. For example, the system may create a data structure that associates each field of the data structure with a particular geo-political feature. In some implementations, the data structure may include an array wherein each field of the array corresponds to one of the geopolitical features that can be selected by a user. In other implementations, the data structure may include a matrix or a portion of a matrix. In other implementations, the data structure may include a table of multiple rows and columns wherein each row is an entity and each column represents a geopolitical feature.

The system may associate 230B each feature of the defined feature vector with one of the feature weights. In some implementations, one or more of the geopolitical features may be associated with a default weight. In the same or other implementations, the one or more geopolitical features may be associated with a user selected weight. In the same, or other, implementations, the one or more geopolitical features may be associated with a weight that is comprised of a default weight for a geopolitical feature that has been scaled based on a user weight for the geopolitical feature.

The system may provide 240B the defined feature vector to a similarity module for identifying analogous entities. Providing the defined feature vector to the similarity module may include, for example, transmitting the defined feature vector to the similarity module.

Figure 2C:
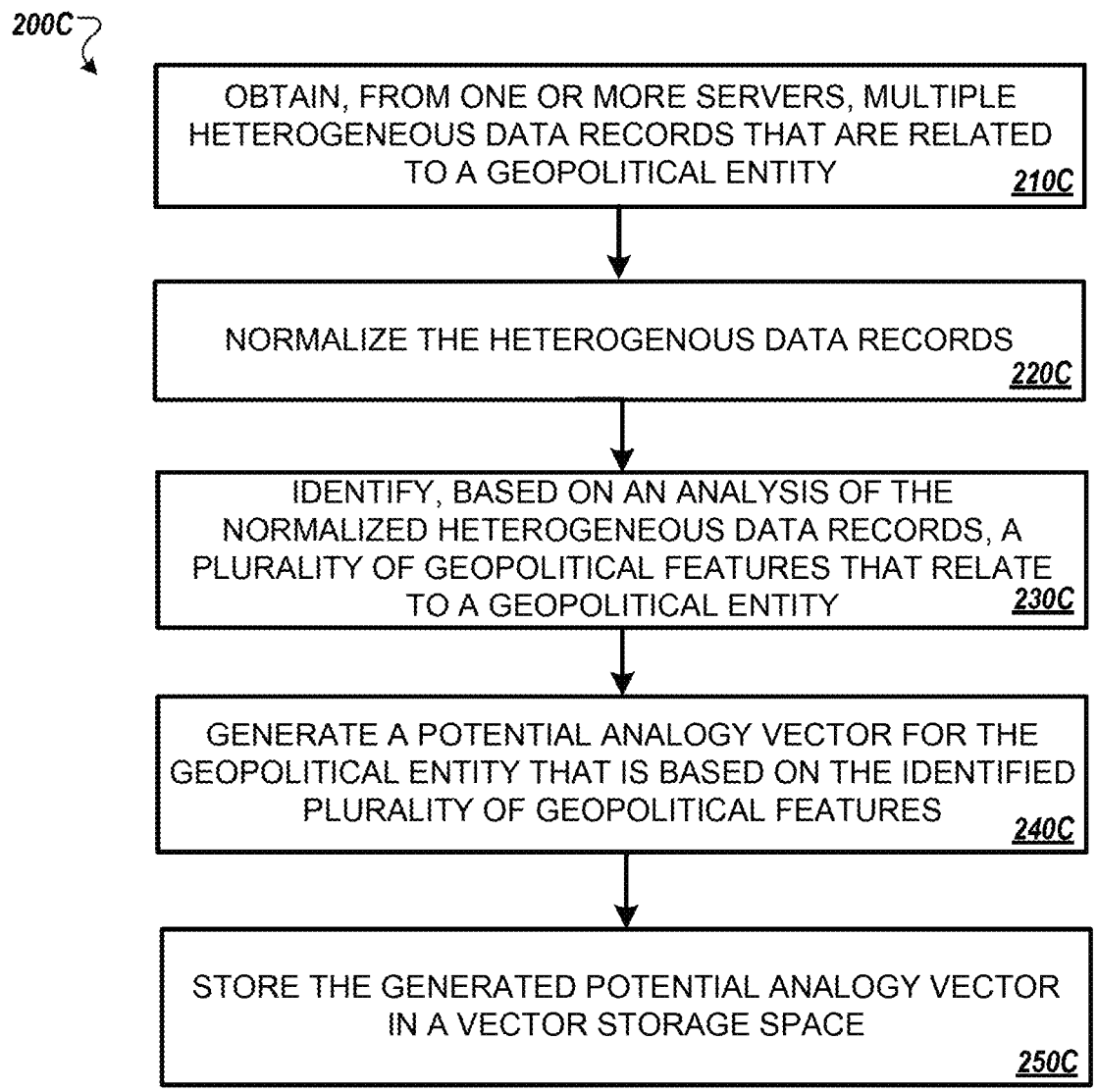
FIG. 2C is a flowchart of an example of a process for generating a plurality of potential analogy vectors.

FIG. 2C is a flowchart of an example of a process 200C for generating a plurality of potential analogy vectors. Generally, the process 200C includes obtaining, from one or more servers, multiple heterogeneous data records that are related to a geopolitical entity (210C), normalizing the heterogeneous dat records (220C), identifying, based on analysis of the normalized heterogenous data records, a plurality of geopolitical features that relate to a geopolitical entity (230C), generating a potential analogy vector for the geopolitical entity that is based on the identified plurality of geopolitical features (240C), and storing the generated potential analogy vector in a vector storage space (250C). For convenience, the process 200C will be further described below as being performed by a system such as system system 100, the system 200, or the system 300 described with reference to FIG. 1, 2, or 3 respectively.

In more detail, a system may obtain 210C, from one or more servers, multiple heterogeneous data records that are related to a geopolitical entity. The one or more servers may include a plurality of disparate servers that are maintained by one or more third parties. The system is configured to communicate with the one or more servers in order to receive streams of heterogeneous data records from the one or more servers.

The system may normalize 220B the heterogeneous data records. Normalizing the heterogeneous data records may include analyzing the obtained heterogeneous data records to determine the source of each data record. Once the source of the data record is determined, the system can determine a class that is associated with the source. The class may include one or more processes that can be used to transform the data record into a standardized format such as entity-year, entity-month, or the like. In some implementations, the entity may include a country, a corporation, a person, or the like. The processes performed by each class may be source-specific.

The system may identify 230C, based on an analysis of the normalized heterogeneous data records, a plurality of geopolitical features that relate to a geopolitical entity. Identifying a plurality of geopolitical features that relate to a geopolitical entity may include detecting the occurrence of one or more predetermined geopolitical features such as an entity name, a date, an event, one or more economic features, one or more political features, one or more demographic features, one or more security features, or a combination thereof. In some implementations, the identified plurality of geopolitical features may be extracted from the normalized heterogeneous data records.

The system may generate 240C a potential analogy vector for the geopolitical entity that is based on the identified plurality of geopolitical features. Generating the potential analogy vector for the geopolitical entity that is based on the identified plurality of geopolitical features may include associating the extracted feature data with a field of a multi-dimensional analogy feature vector that corresponds to the geopolitical feature and associating the field with a corresponding feature weight.

The system may store 250C the generated potential analogy vector in a vector storage space. In some implementations, this may include writing the generated potential analogy vector to a data storage location using a data structure such as a an array, an entry (e.g., row and one or more columns) in a database table, a field of a matrix, or the like.

Figure 3:
FIG. 3 is an example of a user interface through which a user can input one or more features that the system can use to generate a reference vector.

FIG. 3 is an example of a first user interface 300 through which a user can input one or more features that the system can use to generate a reference vector. More specifically, a user can use the illustrated user interface 300 to select a country and date for which to find analogies. The default date is the present, though a user may analogize for cases back in time, e.g., as far back as 1960.

Figure 4:
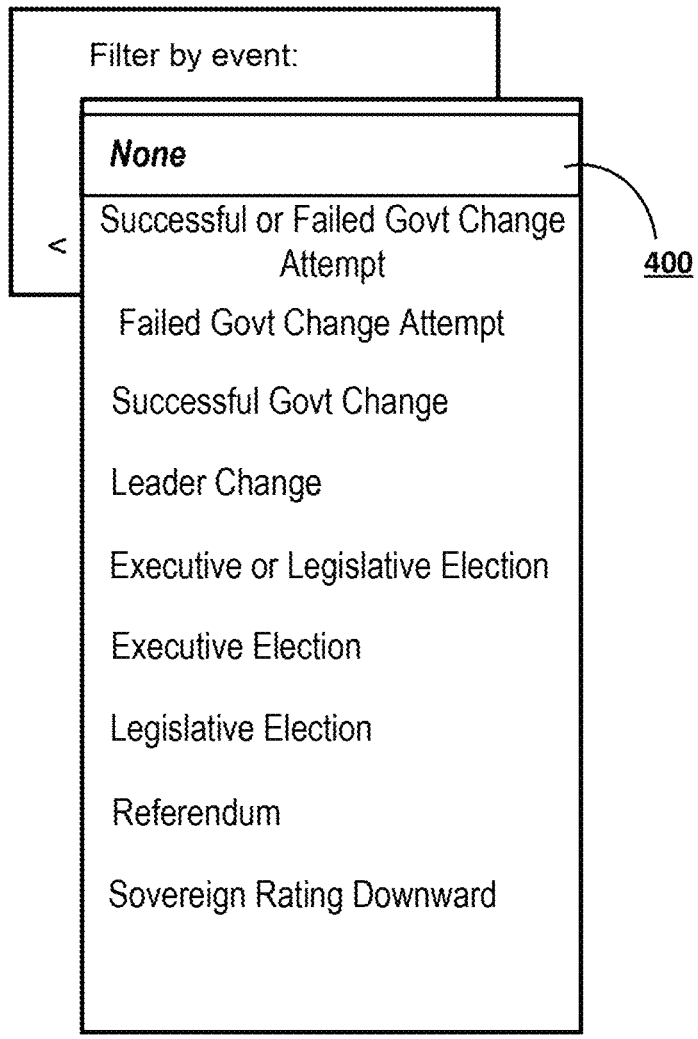
FIG. 4 is an example of a user interface through which a user can input one or more features that that the system can use to generate a reference vector.

FIG. 4 is an example of a second user interface 400 through which a user can input an additional one or more features that that the system can use to generate a reference vector. More specifically, a user can use the illustrated user interface 400 to select an event if the user wants to limit analogies to moments in which that particular event occurred. This option is particularly useful for conducting scenario analysis, as it provides information about political and economic dynamics before and after events of interest. This event selection can be modified, in this example, once the initial list of analogous countries is generated.

Figure 5:
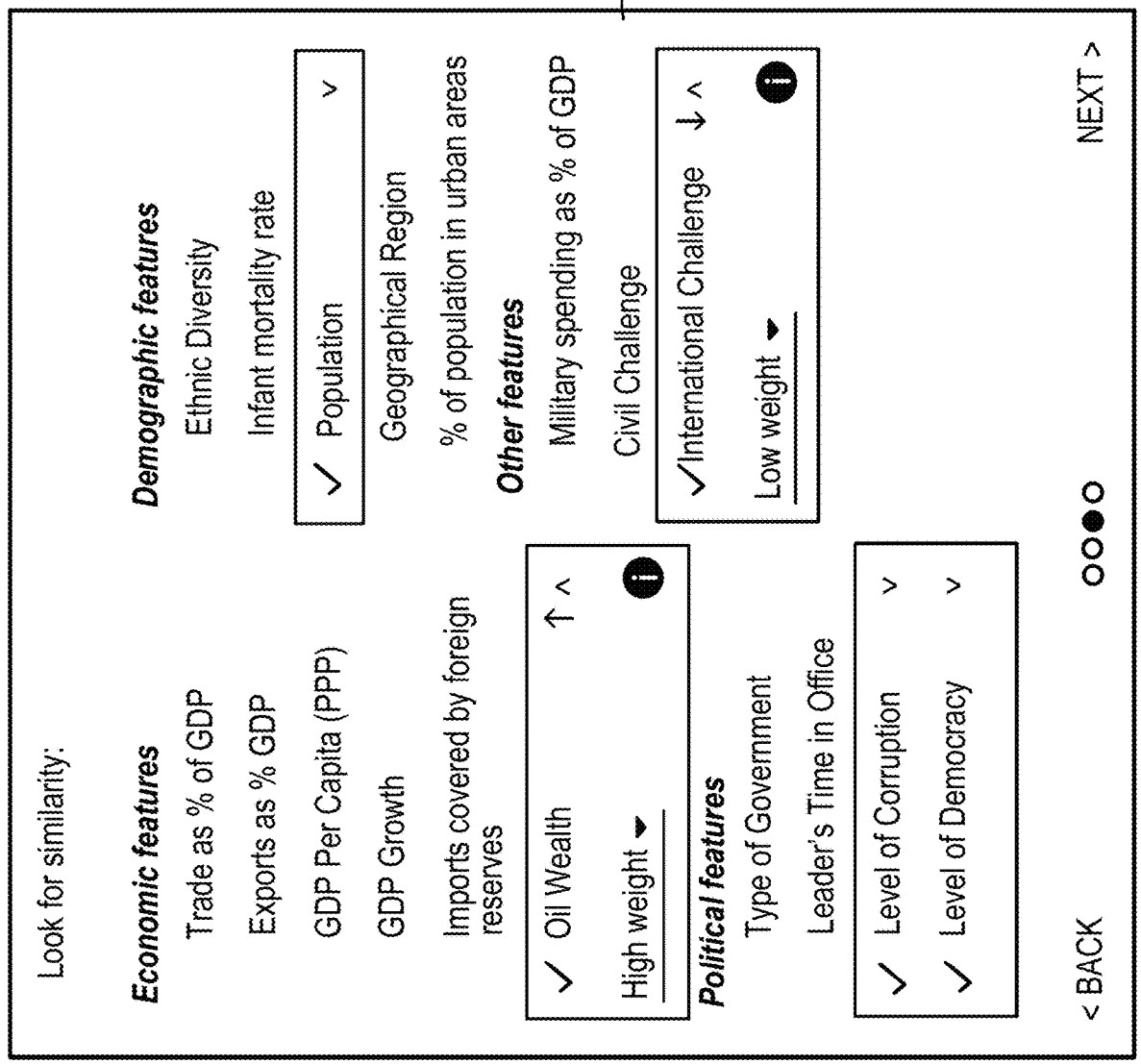
FIG. 5 is an example of a user interface through which a user can input one or more features, feature weights, or both, that the system can use to generate a reference vector.

FIG. 5 is an example of a third user interface 500 that through which a user can input an additional one or more features, feature weights, or both, that the system can use to generate a reference vector. More specifically, an embodiment of the analogy engine compares cases and generates analogies using data covering nearly all countries in the world going back in time, e.g., going as far back as 1960. A user can choose features that she finds geopolitically relevant given her interests in the reference case. By default, all features are weighted equally in the search for analogies, but a user can assign "high" or "low" weights to individual features to increase or decrease their influence in the analogizing process. A user can modify features and weights after the initial list of analogous countries is generated.

Figure 6:
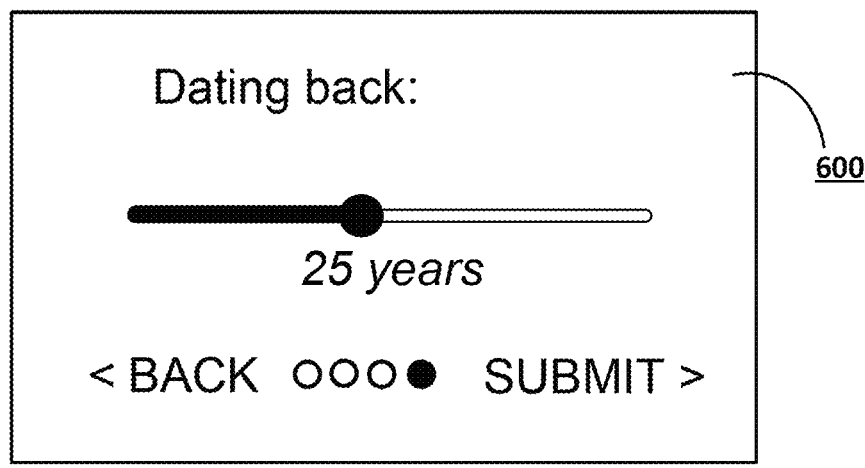
FIG. 6 is an example of a fourth user interface through which a user can input a time period from which potential analogous entities should be identified.

FIG. 6 is an example of a fourth user interface 600 through which a user can input a time period from which analogies should be identified. More specifically, a user can select the period from which analogies should be drawn. In one embodiment, the default is the past 25 years from the present. A user can change the time period after the initial list of analogous countries is generated.

Figure 7:
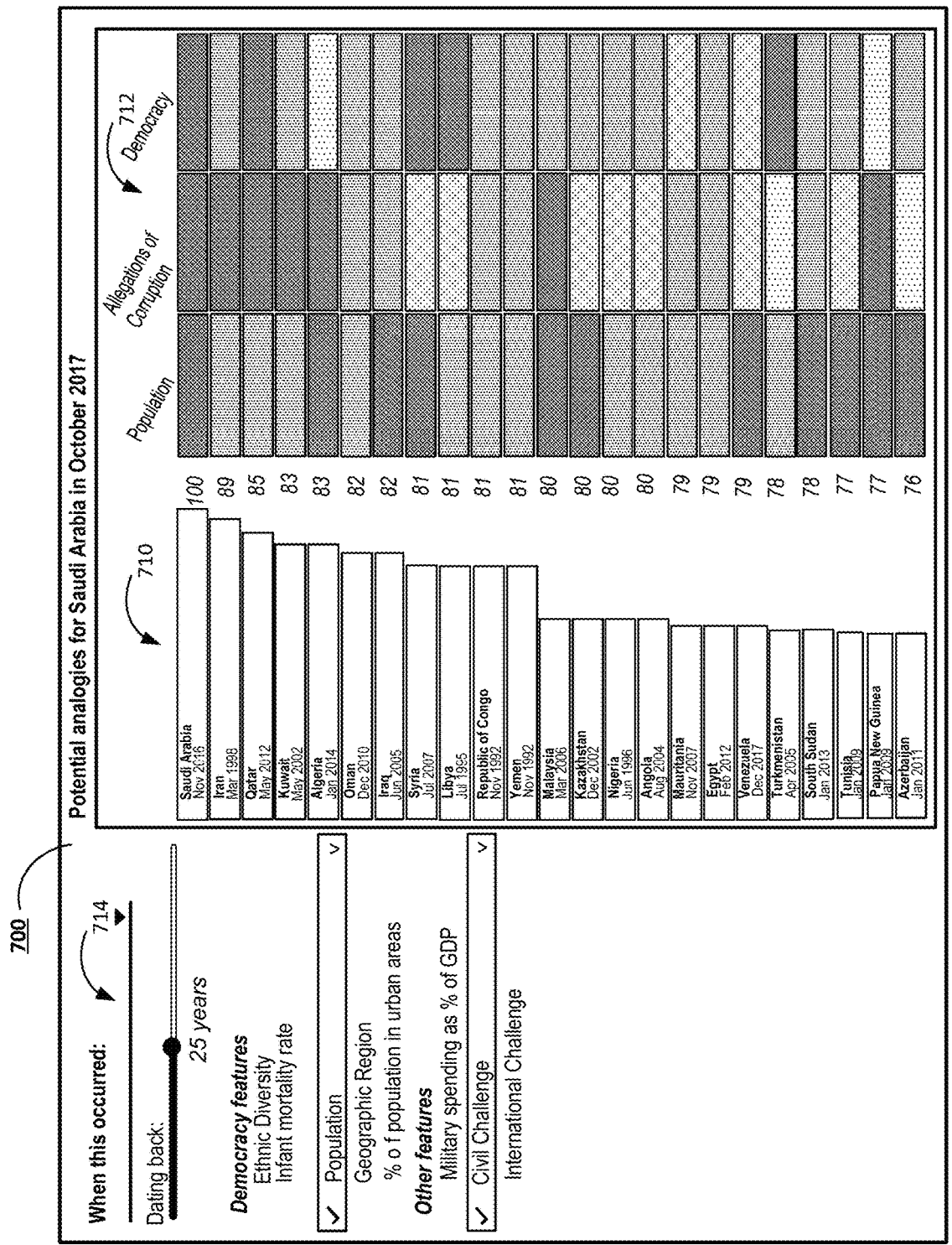
FIG. 7 is an example of an interactive user interface that can be used to output a set of one or more entities that are potentially analogous to a set of features represented by a reference vector.

FIG. 7. is an example of an interactive user interface 700 that can be used to output a set of one or more entities that are analogous to the features represented by the reference vector. More specifically, FIG. 7 shows a set of countries and dates 710 that are similar to Saudi Arabia in October 2017 on the basis of, for example, population, allegations of corruption and a democracy index. Each potential analogous entity is associated with a total similarity score that has been scaled to a value within a predetermined range such as 0 to 100 in order to make the similarity metric easy for a user to understand. In the illustrated embodiment, the potential analogous entities are listed in order of similarity score.

The user interface 700 also depicts a heat map 712 that provides a visual indication of the similarity of the countries and dates 710 to Saudi Arabia of October 2017. In addition, the user interface 700 also depicts interactive features 714 which can be used to re-generate, refine, or both, the set of similar countries and dates 710. Alternatively, or in addition, the selection of one or more of the features may result in the selection of a common attribute that generates a numerical representation of the selected common attribute and triggers the generation of one or more visualizations that graphically depict the value of each common attribute for each similar country and date in the set of similar countries and dates 710.

Figure 8:
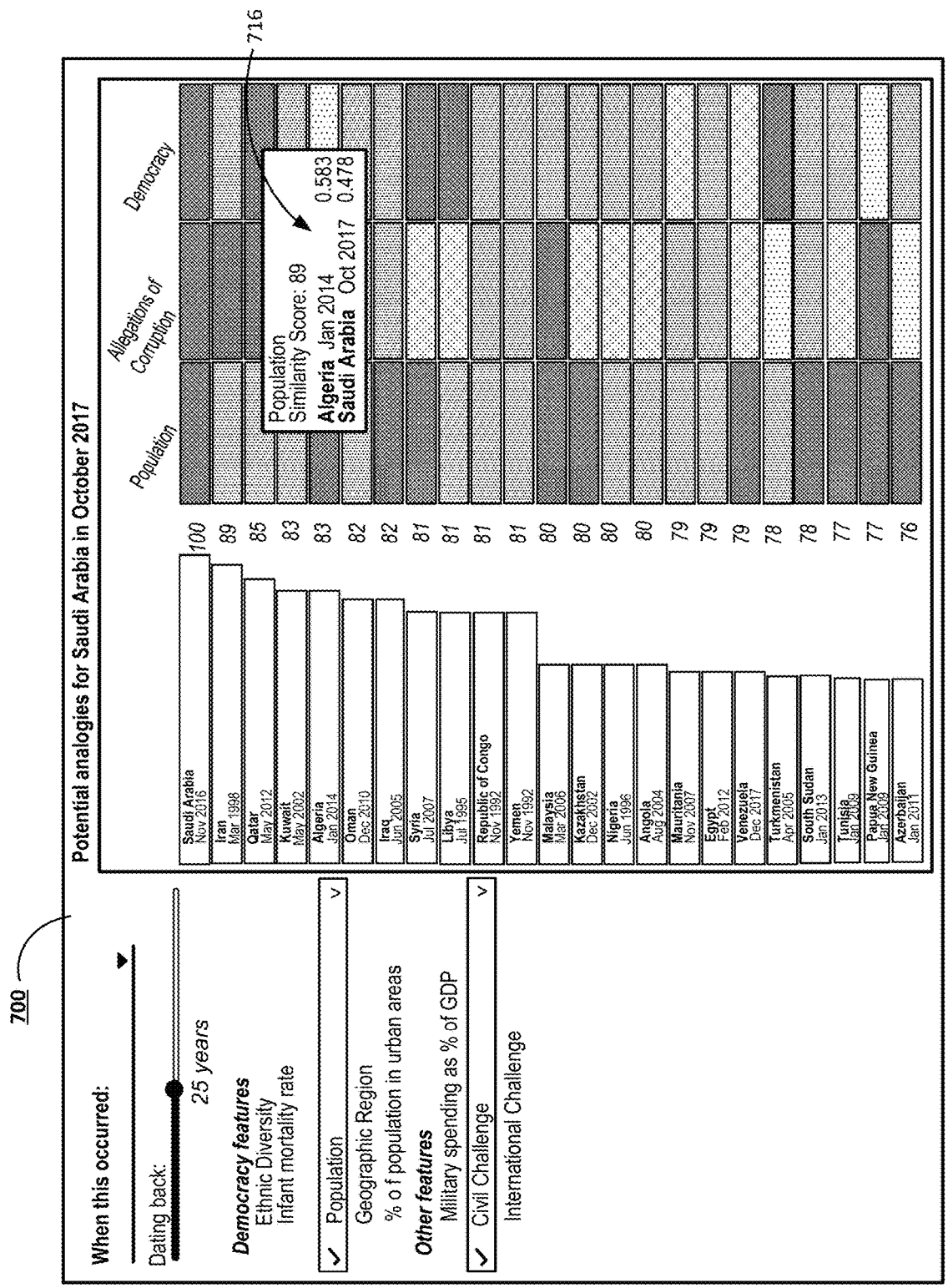
FIG. 8 is an example of the user interface of FIG. 7 showing a pop-up window responsive to a user selection.

FIG. 8 is another example of an interactive user interface 700 that can be used to output a set of one or more entities that are analogous to the features represented by the reference vector. Aspects of the user interface such as squares of the heat map may be interactive such that when a user selects the square of the heatmap the user interface renders a pop-up window 716 that depicts a numerical representation of one or more common attributes, one or more similarity measures, or a combination thereof, for Saudi Arabia of February 2017 and the selected country and date that is similar (e.g., Algeria, January 2014).

Figure 9:
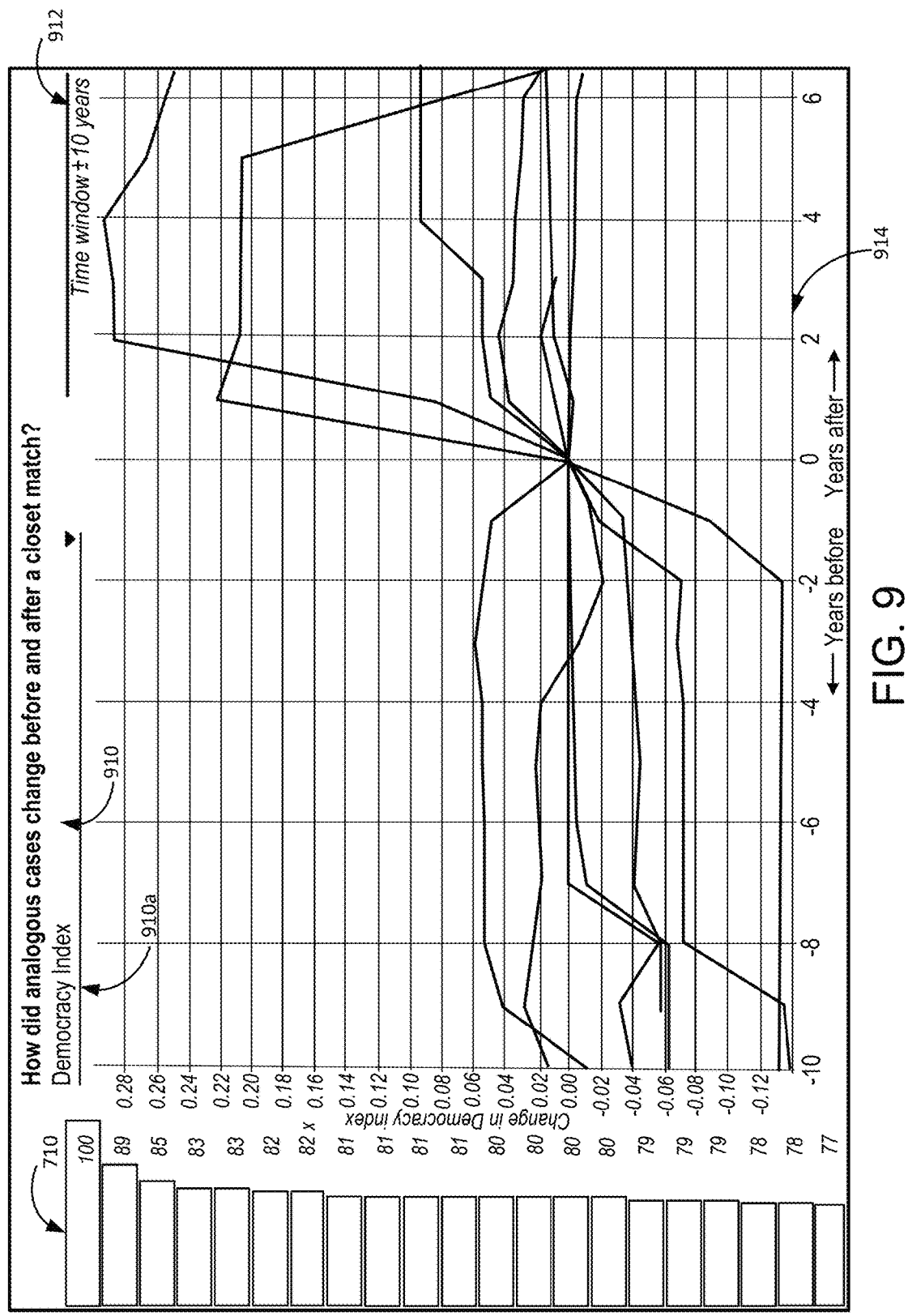
FIG. 9 is an example of an interactive user interface that can be generated to display a graphical representation of a change in a first common attribute for a plurality of potentially analogous entities identified based on a reference vector.

FIG. 9 is an example of an interactive user interface 900 that can be generated to display a graphical representation of a change in a first common attribute for each analogous entity with respect to a point of a closest match in response to the user selection of the first common attribute. In some implementations, the user interface 900 may be an extension of the user interface 700 that may be revealed by, for example, scrolling to another portion of the user interface 700.

The user interface 900 may provide a common attribute input box 910 that provides a plurality of predetermined common attributes such as the common attribute of a democracy index 910a over a particular time period 912 that is configurable. Selection of the common attribute triggers a determination of a numerical representation of the common attribute for each similar country in the similar country and date list of 710 and rendering of a visual representation 914 of the numerical representation of the common attribute for each similar country in the similar country and date list of 710.

Figure 10:
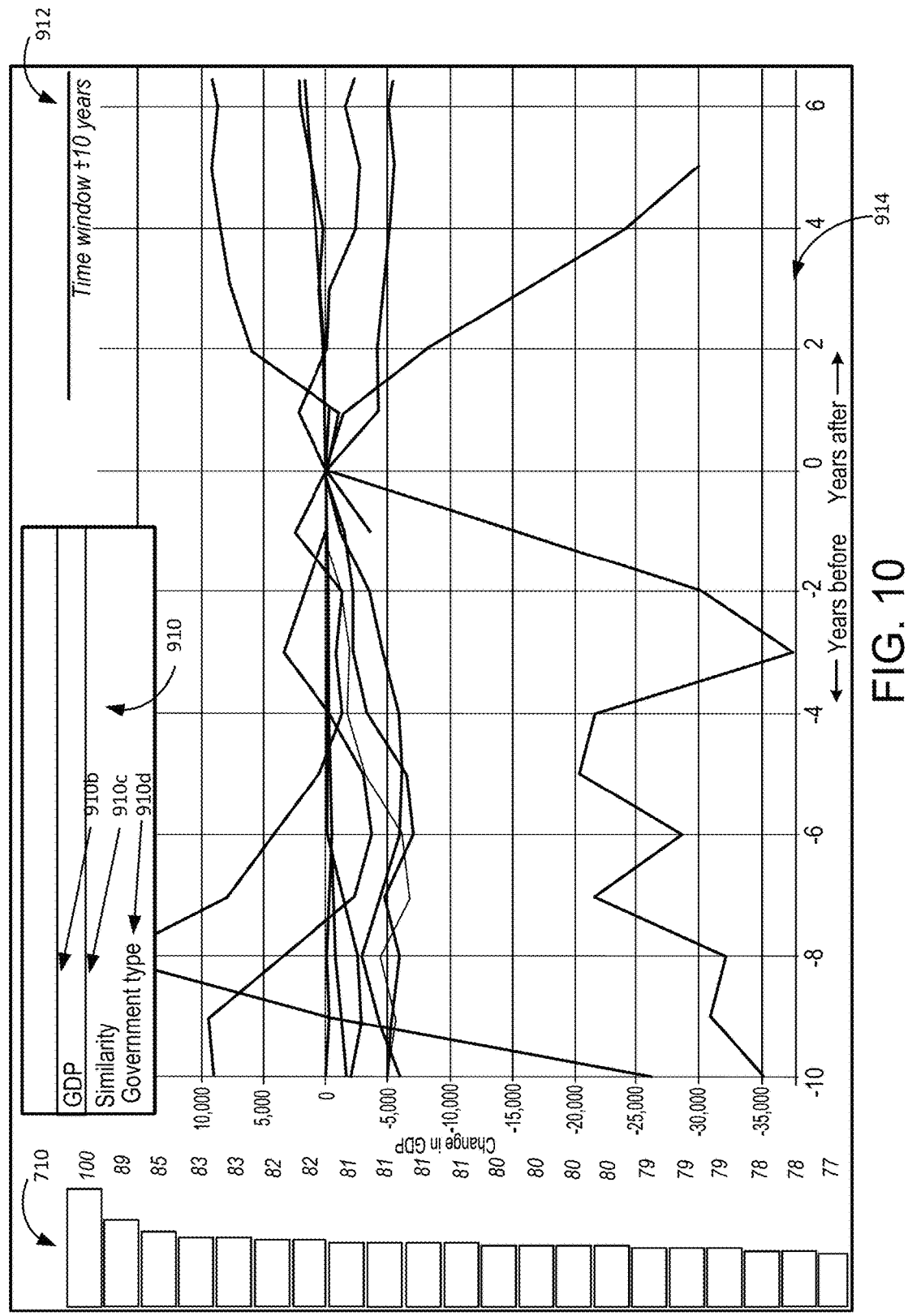
FIG. 10 is an example of the user of a drop-down box from the user interface of FIG. 7 to select a different common attribute.

FIG. 10 is an example of another interactive user interface 900 that can be generated to display a graphical representation of a change in a second common attribute for each analogous entity with respect to a point of a closest match in response to the user selection of the second common attribute. For example, the user interface 900 shows that a user can interact with the common attribute input box 910 to select a different common attribute such as GDP 910b, similarity 910c (e.g., distance or scaled similarity score), government type, 910d, or any other feature or attribute upon which the similar countries may be compared. Upon the selection of a particular common attribute 910b, 910c, 910d, an updated user interface 900 may be rendered to update the graphical visualisation 914 to display a visual representation 914 of the numerical representation of the newly selected common attribute for each similar country in the similar country list 710.

Figure 11:
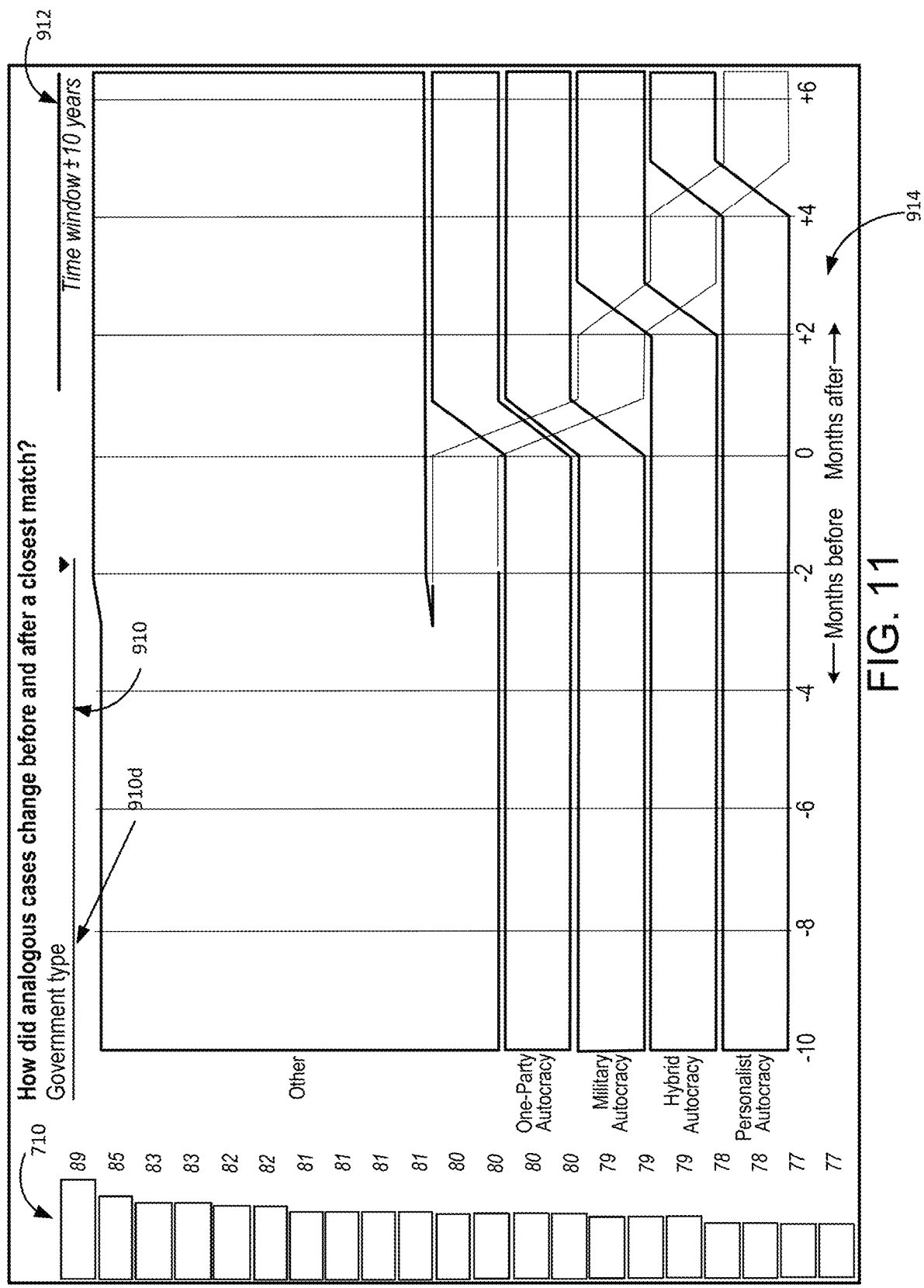
FIG. 11 is an example of an interactive user interface that can be generated to display a graphical representation of a change in the different common attribute for each analogous entity that was selected using a drop-down box.

FIG. 11 is an example of another interactive user interface 900 that can be generated to display a graphical representation of a change in a third common attribute for each analogous entity with respect to a point of a closest match in response to the user selection of the third common attribute. For example, an updated visualization 914 is rendered in response to the selection of the common attribute of a government type 910d via the common attribute input box 910. In this example, the updated visualization may display how the analogous countries and dates change with respect to the newly selected common attribute before and after a closest match. "Closest match" here refers to the point in time at which each potential analogy's similarity score was highest.

Figure 12:
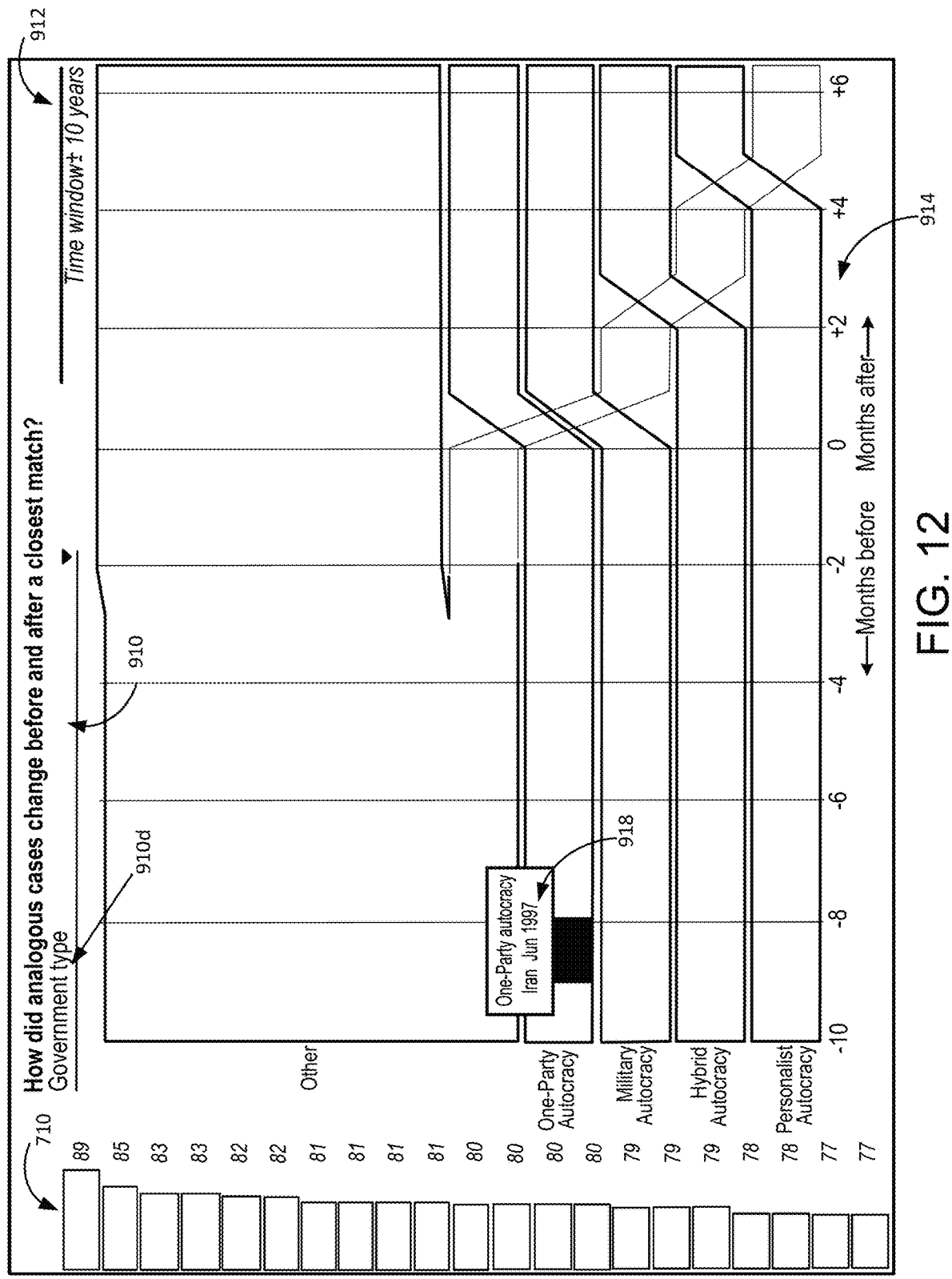
FIG. 12 is an example of the user interface of FIG. 11 showing a pop-up window responsive to a user selection.

FIG. 12 is an example of another interactive user interface 900 that can be generated to display a graphical representation of a change in a third common attribute for each analogous entity with respect to a point of a closest match in response to the user selection of the third common attribute. Aspects of the user interface such as portions of the updated visualization 914 may be interactive such that when a user selects a portion of the user interface, the user interface renders a pop-up window 918 that depicts data associated with the common attribute (e.g., that during the time period selected the similar country Iran was associated with a government type of One-Party Autocracy). FIG. 12 is an alluvial chart, which shows change over time in a categorical (a.k.a. nominal) feature like type of government. Categorical features don't have an inherent scale, so one doesn't use a line chart with its scalar y-axis (which is what is shown in FIGS. 10 and 11).

Figure 13:
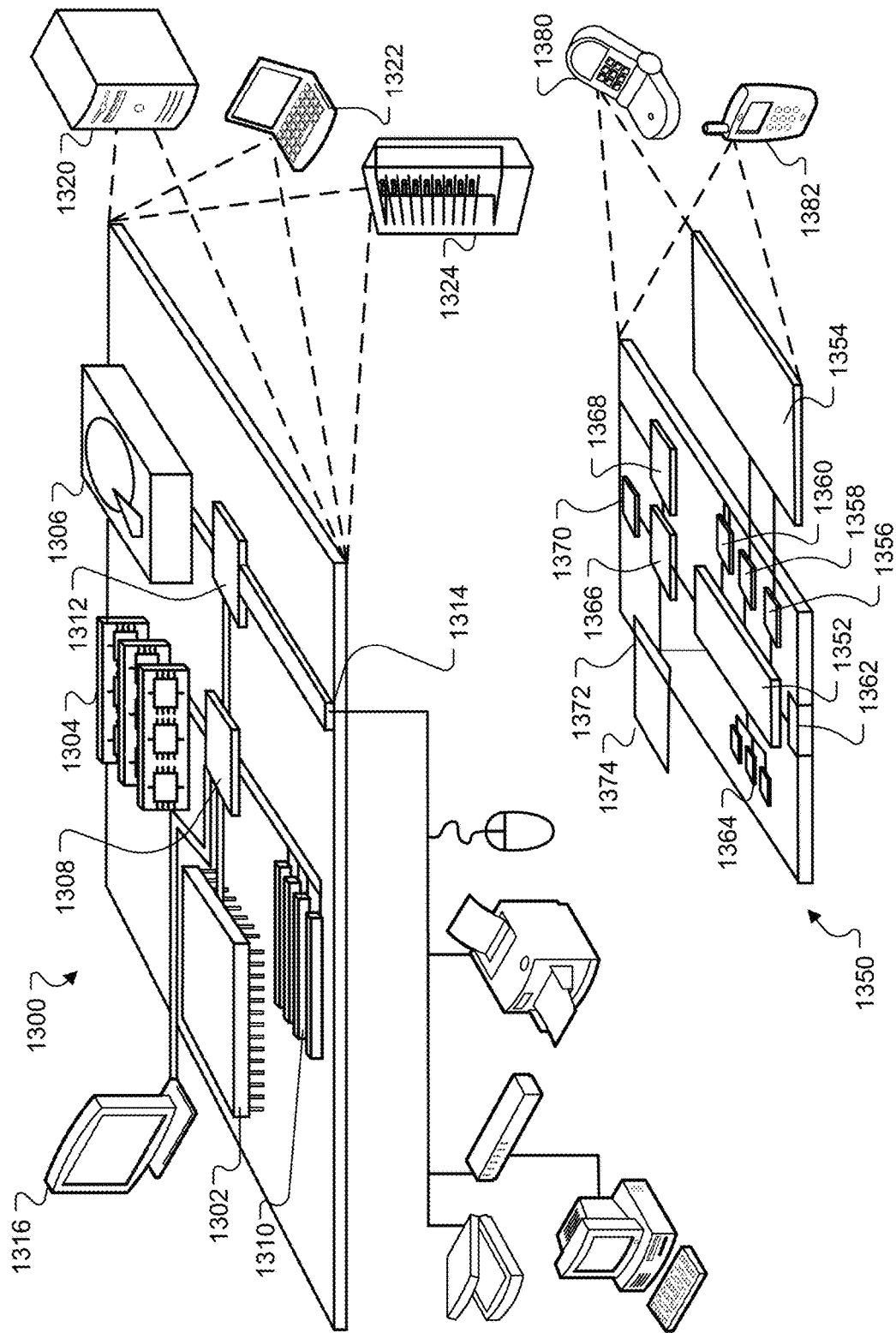
FIG. 13 is an example of system components that can be used to implement the system of FIGS. 1A, 1B, 1C and execute the process of FIGS. 2A, 2B, 2C.

FIG. 13 is an example of system components that can be used to implement the system of FIGS. 1A, 1B, 1C and execute the process of FIGS. 2A, 2B, 2C.

Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smartphones, and other similar computing devices. Additionally, computing device 1300 or 1350 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various buses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic, computer-readable hardware storage device or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing devices 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT (Thin-Film-Transistor Liquid Crystal Display) display or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be in communication with processor 1352, so as to enable near area communication of device 1350 with other devices. External interface 1362 may provide, for example, for wired communication, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In-Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352 that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for logical data segmentation may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented system comprising:
(a) an aggregator operable to ingest, normalize and aggregate third party data sets by removing outliers, applying transformations to features, and rescaling features;
(b) a user interface operable to receive data that includes a set of user selected geopolitical features regarding a geopolitical situation and a feature weight for at least one of the user selected geopolitical features;
(c) a master data repository operable to store normalized and aggregated data received from the aggregator;
(d) a processing engine operable to
  (1) receive normalized and aggregated data from the master data repository;
  (2) extract identified geopolitical features and generate a plurality of analogy vectors that each represent a potential geopolitical analogy;
  (3) receive a set of user selected geopolitical features and a feature weight for at least one of the user selected features from the user interface, wherein the selected geopolitical features comprise one or more economic features, one or more political features, one or more demographic features, and one or more regional geopolitical security features;
  (4) generate a reference vector based on the received set of user selected geopolitical features and the feature weight for at least one of the user selected geopolitical features;
  (5) determine a level of similarity between the generated reference vector and each of the plurality of analogy vectors;
  (6) provide, for output on a display of a user device, a set of one or more geopolitical analogies based on the determined level of similarity;
  (7) receive a subsequent request to evaluate one or more of the displayed geopolitical analogies based on a common geopolitical attribute;
  (8) determine, for the one or more of the displayed geopolitical analogies being evaluated, a representation of a variation over time of the common geopolitical attribute; and
  (9) provide, for display on the user device, a representation of the variation over time of the common geopolitical attribute for the one or more of the displayed geopolitical analogies being evaluated.

2. A computer-implemented method comprising:
using an aggregator to ingest, normalize and aggregate third party data sets by removing outliers, applying transformations to features, and rescaling features;
using a user interface to receive data that includes a set of user selected geopolitical features regarding a geopolitical situation and a feature weight for at least one of the user selected geopolitical features;
using a master data repository to store normalized and aggregated data received from the aggregator;
using a processing engine to:
receive normalized and aggregated data from the master data repository;
extract identified geopolitical features and generate a plurality of analogy vectors that each represent a potential geopolitical analogy;
receive a set of user selected geopolitical features and a feature weight for at least one of the user selected features from the user interface, wherein the selected geopolitical features comprise one or more economic features, one or more political features, one or more demographic features, and one or more regional geopolitical security features;
generate a reference vector based on the received set of user selected geopolitical features and the feature weight for at least one of the user selected geopolitical features;

determine a level of similarity between the generated reference vector and each of the plurality of analogy vectors;

provide, for output on a display of a user device, a set of one or more geopolitical analogies based on the determined level of similarity;

receive a subsequent request to evaluate one or more of the displayed geopolitical analogies based on a common geopolitical attribute;

determine, for the one or more of the displayed geopolitical analogies being evaluated, a representation of a variation over time of the common geopolitical attribute; and provide, for display on the user device, a representation of the variation over time of the common geopolitical attribute for the one or more of the displayed geopolitical analogies being evaluated.

3. The method of claim 2, wherein determining a level of similarity between the generated reference vector and each of the plurality of vectors representing a potential analogous entity comprises:

determining a Euclidean distance between the generated reference vector and each of the plurality of vectors representing the potential analogous entity.

4. The method of claim 2, wherein the common attribute is a democracy index.

5. The method of claim 2, wherein the method further comprises transforming selected features of a set of potential analogies to produce the plurality of analogy vectors.

6. The method of claim 2, further comprising receiving data that includes a user-selected entity.

7. The method of claim 6, wherein the user-selected entity is a country and a month.

8. One or more computer-readable non-transitory storage medium encoded with instructions that, when executed by one or more computers, cause the one or more computers to perform operations comprising:

using an aggregator to ingest, normalize and aggregate third party data sets by removing outliers, applying transformations to features, and rescaling features;

using a user interface to receive data that includes a set of user selected geopolitical features regarding a geopolitical situation and a feature weight for at least one of the user selected geopolitical features;

using a master data repository to store normalized and aggregated data received from the aggregator;

using a processing engine to:

receive normalized and aggregated data from the master data repository;

extract identified geopolitical features and generate a plurality of analogy vectors that each represent a potential geopolitical analogy;

receive a set of user selected geopolitical features and a feature weight for at least one of the user selected features from the user interface, wherein the selected geopolitical features comprise one or more economic features, one or more political features, one or more demographic features, and one or more regional geopolitical security features;

generate a reference vector based on the received set of user selected geopolitical features and the feature weight for at least one of the user selected geopolitical features;

determine a level of similarity between the generated reference vector and each of the plurality of analogy vectors;

provide, for output on a display of a user device, a set of one or more geopolitical analogies based on the determined level of similarity;

receive a subsequent request to evaluate one or more of the displayed geopolitical analogies based on a common geopolitical attribute;

determine, for the one or more of the displayed geopolitical analogies being evaluated, a representation of a variation over time of the common geopolitical attribute; and provide, for display on the user device, a representation of the variation over time of the common geopolitical attribute for the one or more of the displayed geopolitical analogies being evaluated.

9. The computer readable non-transitory storage medium of claim 8, wherein determining a level of similarity between the generated reference vector and each of the plurality of vectors representing a potential analogous entity comprises:

determining a Euclidean distance between the generated reference vector and each of the plurality of vectors representing the potential analogous entity.

10. The computer readable non-transitory storage medium of claim 8, wherein the common geopolitical attribute is a democracy index.

11. The computer readable non-transitory storage medium of claim 8, wherein the operations further comprise transforming selected features of a set of potential analogies to produce the plurality of analogy vectors.

12. The computer readable non-transitory storage medium of claim 8, wherein receiving data further comprising receiving data that includes a user-selected entity.

13. The computer readable non-transitory storage medium of claim 12, wherein the user-selected entity is a country and a month.

* * * * *